DEMAGNETIZATION OF ELECTROMAGNETIC RECORDING HEADS
Filed Feb. 7, 1947
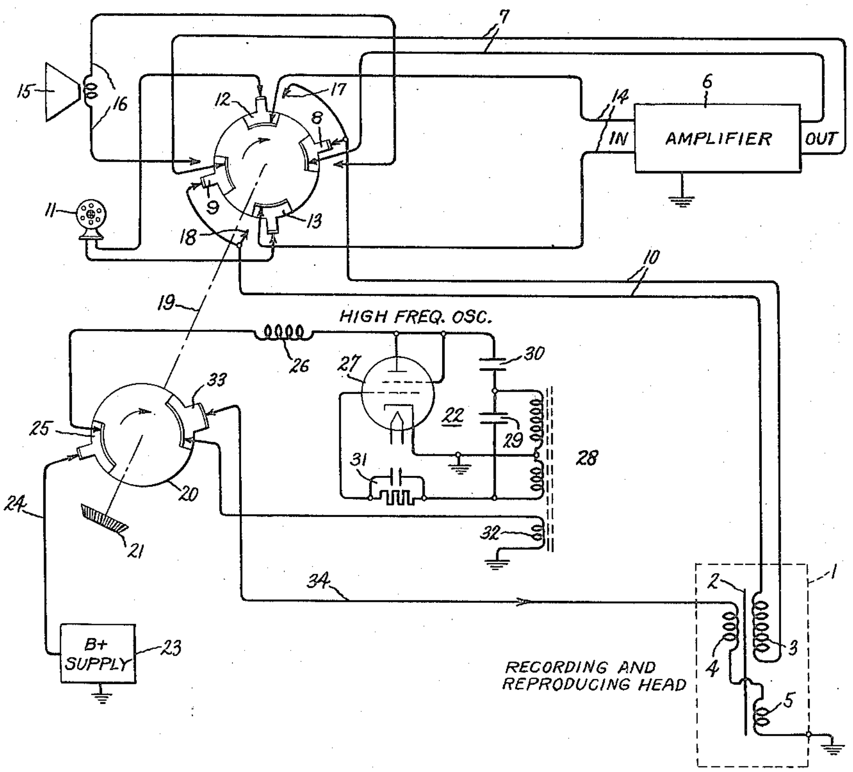
Inventor:
William F. Lootens,
by Merton D. Morse
His Attorney.

Patented Nov. 21, 1950

2,531,141

UNITED STATES PATENT OFFICE 2,531,141

DEMAGNETIZATION OF ELECTROMAGNETIC RECORDING HEADS

William F. Lootens, Syracuse, N. Y., assignor to General Electric Company, a corporation of New York Application February 7, 1947, Serial No. 727,177

10 Claims. (Cl. 179—100.2)

This invention relates to magnetic recorders and more specifically to the demagnetization of electromagnetic heads used in making magnetic recordings.

An object of the invention is to provide, in magnetic recording equipment, a method and means for demagnetizing the recording head.

More specifically, the object of the invention is to provide a method and apparatus for demagnetizing an electromagnetic head at the end of a recording period so as to condition the head for use thereafter as a reproducing head.

The invention is particularly applicable to magnetic wire or tape recording equipments wherein the recording head is energized by a varying current representing signals to be recorded, such as audio frequency signals, and is concurrently energized with an alternating current of a frequency outside of the band of signal frequencies, which alternating current is normally termed a biasing current and which may be of a supersonic frequency. It has been found in systems of this type that if the supersonic alternating current generator is quickly disconnected from the head, a residual magnetism remains which corresponds in intensity to the point on the cycle at which the disconnection is completed. If the head is left in a magnetized condition, it has been found that when a magnetic wire or tape recording medium is drawn across the head for reproducing the recorded signals, noise signals are induced in the pick-up coils of the head. It is thought that this effect is due to variations in reluctance along the length of the recording medium which cause variations in the reluctance of the flux path for the residual magnetism.

It is accordingly an additional object of this invention to reduce or eliminate noise signals of this nature in magnetic recording and reproducing equipments.

The novel features which I believe to be characteristic of my invention are set forth with particularity in the appended claims. My invention itself, however, both as to its organization and method of operation, together with further objects and advantages thereof may best be understood by reference to the following description taken in connection with the accompanying drawing in which is shown diagrammatically a magnetic recording equipment incorporating the invention.

Referring now to the drawing, an electromagnetic recording and reproducing head 1 is represented as incorporating a paramagnetic core 2, and an exciting and pick-up winding 3 to which the signals to be recorded are applied and which operates as a pick-up coil when the head is used for reproducing magnetically recorded signals. In addition, coils 4 and 5 are incorporated to energize core 2 at a biasing frequency which lies outside of the frequency band of the signals to be recorded.

The exciting winding 3 during recording may be energized as shown from the output circuit of an audio amplifier 6, which is connected through conductors 7 and contact segments 8 and 9, of a wafer or other type of switch, through conductors 10 to the winding 3. With the switch in the position shown, the input circuit of the amplifier is connected to receive signals to be recorded from a microphone 11 through contact segments 12 and 13 and conductors 14.

The switch is so arranged that upon rotation in the direction of the arrow, connections are established from the output of the amplifier through conductors 7 to a loud speaker 15 through conductors 16. At the same time, winding 3 of the electromagnetic head is disconnected from the amplifier output circuit and is connected through switch contacts 17 and 18, conducting segments 12 and 13, and conductors 14 to the input circuit of the amplifier 6. With these connections, the equipment is arranged for reproducing magnetic recordings which produce signals in winding 3 operating as a pick-up coil.

Ganged for simultaneous operation with the switch elements described, as indicated by dashed line 19, is an additional group of switch elements indicated as positioned on and about a wafer 20. Thus arranged, the above described changes in connections to winding 3, loudspeaker 15, microphone 11 and the input and output circuits of amplifier 6 are accomplished as desired by rotating a dial 21. Such rotation also changes, by simultaneously rotating wafer 20, the connections associated with a supersonic biasing current generator or oscillator 22. With the switch position shown in the drawing, winding 3 of the head is connected for recording to the output circuit of amplifier 6, and the supersonic generator is provided with operating potential from a source 23 for supplying B+ voltages. As shown, the B+ supply is connected through conductor 24 and conducting segment 25 to the plate circuit of oscillator 22, preferably through a suitable choke 26. Oscillator 22 is connected as a conventional Hartley oscillator and comprises electron discharge device 27, transformer 28, frequency determining capacitor 29, decoupling and energy storage capacitor 30 and a grid leak and capacitor circuit 31. Transformer 28 may be provided with an iron core or powdered iron core. Suitable voltages are applied to the heater of discharge device 27 in any convenient manner.

Coil 32, wound on the core of transformer 28, comprises the output coupling from oscillator 22 and is connected through conducting segment 33 and conductor 34 to the biasing coils 4 and 5 to provide the supersonic biasing energization of core 2 of the head during recording periods.

As shown in the drawing, the portion of conducting segment 33 for connecting the oscillator output to coils 4 and 5 of the head, is considerably broader than the conducting segment which connects the B+ supply to the oscillator anode circuit. Thus, when the switch is rotated in the direction of the arrow by rotation of dial 20, the B+ supply is disconnected from the oscillator before the oscillator is disconnected from coils 4 and 5 of the head. Accordingly, when the head is switched from the recording to the reproducing connections, the switching sequence will be in the following steps: simultaneously the B+ supply is disconnected from the oscillator, winding 3 of the head is disconnected from the output circuit of amplifier 6, and microphone 11 is disconnected from the amplifier input; an appreciable time thereafter, the oscillator output is disconnected from coils 4 and 5 of the head; finally, winding 3 is connected to the input circuit of amplifier 6 and the output circuit is connected to loud speaker 15. During the interval, which may be only a fraction of a second, between the disconnection of the B+ supply from the oscillator and the disconnection of coil 32 from coils 4 and 5, the oscillator generates a current of decaying intensity utilizing the energy stored in capacitor 30 and in the core of transformer 28. This current of decaying intensity is provided to the coils 4 and 5 of the recording head and serves to substantially eliminate residual magnetism in core 2. Since the oscillator may be designed to generate a biasing current at, for example, 40,000 cycles, and since the capacity of condenser 30 and the flux stored in the core of transformer 28 may be low in value, the current generated by the oscillator after removal of the B+ supply will decay rapidly but, because of the high frequency involved, a relatively large number of cycles will be generated before the oscillator output becomes zero. In practice, it has been found that the oscillator output falls to substantially zero during the manual rotation of dial 21 through only a few degrees, but that, during this time, the oscillator will have generated a relatively large number of cycles sufficient to substantially eliminate any residual magnetism in the head.

Although it has been found preferable to disconnect winding 3 from the amplifier output simultaneously with the disconnection of the operating potential supply from the oscillator, such as is accomplished by switch segments of the lengths and positions shown, this is not necessary to satisfactory operation of the invention. Even though winding 3 receives audio signals from the output circuit of the amplifier after the connection from the oscillator power supply is broken, the head has been found to be left substantially free of residual magnetism.

While the invention has been described with particular reference to magnetic wire or tape recording equipments, it is equally applicable to recording equipments utilizing an alternating biasing current for recording on other magnetic media, such as magnetic disks, cylinders, or magnetically coated tapes. It will be understood that additional switching devices may be ganged with the switch device disclosed to accomplish such additional functions as for example to connect the output of a radio receiver to the input of amplifier 6 to permit recording of radio programs, and if desired, to provide for connecting a radio receiver through the amplifier to the loud speaker without any connections being made to the recording and reproducing head 1.

While I have shown only certain preferred embodiments of my invention by way of illustration, many modifications will occur to those skilled in the art and I therefore wish to have it understood that I intend, in the appended claims, to cover all such modifications as fall within the true spirit and scope of my invention.

What I claim as new and desire to secure by Letters Patent of the United States is:

1. In a magnetic recording and reproducing system a recording and reproducing head, an energy source coupled to said head for exciting said head with oscillations at a predetermined constant frequency during recording, and means for conditioning said head for reproducing comprising means for progressively reducing the intensity of said oscillations from said source, and means operative after said oscillations have been substantially reduced for decoupling said source from said head.

2. A magnetic transducer comprising a common electromagnetic recording and reproducing head, means for energizing said head with a varying current representing the signals to be recorded, means for concurrently energizing said head with alternating current at a frequency above the frequency band of said signals, and means for operating said head as a reproducer comprising means coupled to said energizing means for progressively reducing the intensity of said current, and means for disconnecting said energizing means from said head after said current has been substantially reduced.

3. In a magnetic recording and reproducing head arranged for recording with a biasing signal of supersonic frequency supplied by a source, said source being operatively charged from a power supply to supply said signal, the method of preparing said head for reproducing comprising the sequential steps of removing said power supply from said source to initiate decay of said biasing signals, and disconnecting said head from said source, after said signals have decayed to substantially zero intensity.

4. A magnetic recorder comprising an electromagnetic recording head, an oscillator connected to provide an alternating current biasing signal to said head, energy storage means associated with said oscillator, a source of operating potential for said oscillator, and means for disconnecting said source from said oscillator and for thereafter disconnecting said oscillator from said head, whereby operation of said last means causes said oscillator to supply biasing signals of reducing intensity to said head during the interval after disconnection of said source from said oscillator and prior to disconnection of said oscillator from said head.

5. In a magnetic recording head arranged for simultaneous excitation by audio signals from a signal source and by supersonic biasing signals from a biasing signal generator, switch means for disconnecting said signal source from said head, and commonly operated second switch means for initiating substantially simultaneously decay in intensity of said supersonic signals.

6. In a magnetic recording head arranged for simultaneous excitation by audio signals from a signal source and by supersonic biasing signals from a biasing signal generator, switch means for disconnecting said signal source from said head, commonly operated second switch means for initiating substantially simultaneously decay in intensity of said supersonic signals, and commonly operated third switch means operative after said last means for disconnecting said generator from said head.

7. In a magnetic recording head arranged for simultaneous excitation by audio signals from a signal source and by supersonic biasing signals from a biasing signal generator, means for disconnecting said signal source from said head, and means for initiating decay in intensity of said supersonic signals and for disconnecting said generator from said head after said decay has progressed a substantial amount.

8. In a magnetic recorder comprising an electromagnetic recording head excited by a supersonic biasing signal of a given intensity from a signal source, the method of deenergizing said head comprising the steps of progressively reducing the intensity of said supersonic signal, and decoupling said source from said head after said signal has been reduced a substantial amount.

9. In a magnetic recorder comprising an electromagnetic transducing head arranged to be excited by a supersonic biasing signal from a signal generator, the method of deenergizing said head comprising the step of gradually disabling said generator to provide said supersonic signal at decaying intensity to said head, and disconnecting said generator from said head after said signal has decayed an amount to preclude the existence of any substantial residual magnetism due to said supersonic signal in said head.

10. The method of preparing an electromagnetic recording and reproducing head for the reproducing function at the end of a recording period during which said head has been excited with supersonic biasing signals from a signal source, which comprises the steps of decreasing gradually the intensity of said biasing signals supplied to said head, and thereafter disconnecting said head from said source.

WILLIAM F. LOOTENS.

REFERENCES CITED

The following references are of record in the file of this patent:

UNITED STATES PATENTS

| Number | Name | Date |
|---|---|---|
| 2,296,764 | Braden | Sept. 22, 1942 |
| 2,336,886 | Peterson | Dec. 14, 1943 |
| 2,351,005 | Camras | June 13, 1944 |
| 2,351,010 | Camras | June 13, 1944 |
| 2,387,005 | Bryant | Oct. 16, 1945 |

OTHER REFERENCES

Fiat—Final Report 705, page 12.